United States Patent [19]
Nagata

[11] Patent Number: 5,612,147
[45] Date of Patent: Mar. 18, 1997

[54] CELL BOX AND OPTICAL APPARATUS USING THE SAME

[75] Inventor: Kouichi Nagata, Saitama-ken, Japan

[73] Assignee: Fuji Photo Optical Co., Ltd., Saitama-ken, Japan

[21] Appl. No.: 424,005

[22] Filed: Apr. 18, 1995

[30] Foreign Application Priority Data

Apr. 20, 1994 [JP] Japan ................................. 6-082038

[51] Int. Cl.$^6$ ................................................. H04M 2/10
[52] U.S. Cl. ............................. 429/9; 429/100; 429/123
[58] Field of Search ........................... 429/96–100, 123, 429/9; 352/166, 69; 354/173.1

[56] References Cited

U.S. PATENT DOCUMENTS

| | | | |
|---|---|---|---|
| 3,969,148 | 7/1976 | Trattner | 429/100 |
| 4,142,026 | 2/1979 | Zordan | 429/100 |
| 4,235,506 | 11/1980 | Saito et al. | 350/16 |
| 4,397,920 | 8/1983 | Trattner | 429/100 |
| 4,644,244 | 2/1987 | Kittelson | 429/96 X |
| 4,767,358 | 8/1988 | Nullmeyer et al. | 429/100 X |
| 4,965,141 | 10/1990 | Suzuki | 429/9 |
| 5,071,716 | 12/1991 | Petzl | 429/9 |

*Primary Examiner*—Anthony Skapars
*Attorney, Agent, or Firm*—Leydig, Voit & Mayer

[57] ABSTRACT

A cell box includes a casing and a cell-positioning holder. The casing has a cavity capable of receiving either a first cell or a second cell which are different in shape from each other. The holder is arranged in the cavity. The holder has a through hole capable of receiving a part of said second cell and holds said part in a direction substantially vertical to a longitudinal axis of said through hole. Further, the holder has a surface capable of holding said first cell with an inner surface of the casing in a direction of said longitudinal axis. The cell box is a compact and handy one which is capable of receiving either two types of cells, and it is particularly useful for an optical apparatus which consumes a relatively large electric power and is used outdoors.

24 Claims, 13 Drawing Sheets

CELL BOX AND OPTICAL APPARATUS USING THE SAME

BACKGROUND OF THE INVENTION

1. Field of the Invention

The present invention relates to a cell or battery box capable of receiving either of two types of batteries which are different in shape from each other, and an optical apparatus using the same.

2. Related Background Art

For a conventional portable apparatus such as an optical apparatus which consumes a relatively large amount of electrical power and is mainly used outdoors, a cell with a relatively large capacity, i.e., a lithium battery or the like is often used. Such a cell with a large capacity is rarely available in some regions. Especially in foreign countries, the availability is often low. For this reason, a dry cell having a relatively small capacity must be used for such an apparatus in some cases because of its high availability.

Conventionally, however, a compact and handy cell box capable of receiving either of two types of cells which are different in shape from each other, e.g., either a pack-type lithium cell or a dry cell is not available.

SUMMARY OF THE INVENTION

It is an object of the present invention to provide a compact and handy cell box which is capable of receiving either of two types of cells which are different in shape from each other, and, particularly, to provide such a cell box useful for an optical apparatus which consumes a relatively large electric power and is mainly used outdoors.

According to the present invention, there is provided a cell box for receiving either at least one first cell or at least one second cell, the first cell and the second cell being different in shape from each other, said cell box comprising:

a casing having a cavity capable of receiving either said first cell or said second cell, and a cell-positioning holder being in the cavity, said holder having a through hole capable of receiving a part of said second cell and holding said part in a direction substantially parallel to a longitudinal axis of said through hole, and said holder having a surface capable of holding said first cell with an inner surface of the casing in a direction of said longitudinal axis.

The box according to the present invention will further comprise:

positive and negative external terminals for externally outputting electric power from said cell box, first internal electrodes for connecting positive and negative electrodes of said first cell to said positive and negative external terminals, respectively, and second internal electrodes for connecting positive and negative electrodes of said second cell to said positive and negative external terminals, respectively.

Further, in the box according to the present invention, a part of the casing will constitute a lid portion for exchanging a cell, which can be opened and closed.

When the first cell is received in the cell box of the present invention having the above structure, the first cell is held between the surface of the holder and the inner surface of the casing, and, thus, it is positioned in the cavity of the cell box. On the other hand, when the second cell is received in the cell box of the present invention, at lease a part of the second cell is held by the inner surface of the holder, and, thus, it is positioned in the cavity of the cell box.

As described above, the cell box of the present invention can receive either two types of cells which are different in shape from each other, and either cell is properly held, thereby preventing a contact failure caused due to a displacement of the cell. Further, in the cell box of the present invention, either of the two types of cells is received in the same cavity and positioned by the single cell-positioning holder, resulting in a very compact cell box. Furthermore, in the cell box of the present invention, either of the two types of cells can be received in the cell box only by inserting the cell from the opened lid portion into the cavity. For this reason, a handy cell box which does not require an operation of a switch or the like in accordance with a to-be-received cell can be obtained.

The cell box of the present invention preferably further comprises energizing means which is capable of energizing said holder in a direction of said longitudinal axis.

The energizing means preferably comprises:

a shaft having one end contacting an inner surface of the casing and another end inserted into a hole which is bored into the holder in a direction substantially parallel to said longitudinal axis, said shaft being arranged in a direction substantially parallel to said longitudinal axis, and a spring having one end contacting an inner surface of the casing and another end contacting said holder, said spring being arranged around said shaft.

In the cell box of the present invention having such energizing means, the first cell is pressed by the energized cell-positioning holder against the inner surface of the casing, when the first cell is received in the cell box. Therefore, the first cell is more stably held in the cavity. Further, the holder is held in a direction of said longitudinal axis by the energizing means and a stopper which is preferably formed on an inner surface of the casing, when the second cell is received in the cell box. Furthermore, the holder is held in a direction substantially parallel to said longitudinal axis by the shaft, and a predetermined energizing direction is properly maintained by the shaft.

When at least two second cells which are serially arranged are received in the cell box of the present invention, the cell-positioning holder preferably holds a contact portion between the second cells. When the holder covers the contact portion between the second cells while a plurality of second cells are received in contact with each other in the through hole of the holder, the contact of the second cells is more properly maintained.

According to an aspect of the present invention, the cavity of the casing is defined by a first inner end surface of the casing, a second inner end surface facing the first inner end surface, and an inner perimetrical surface defining an interval between the first inner end surface and the second inner end surface, the inner perimetrical surface being along or parallel to the longitudinal axis of the through hole, and the holder has a first end surface facing the first inner end surface of the casing, a second end surface being opposite to the first end surface, and a perimetrical surface continued from the first end surface to the second end surface, said perimetrical surface being along or parallel to the longitudinal axis of the through hole.

Further, the casing mentioned above preferably has the first inner end surface and the second inner end surface between which the second cell is held in a direction of or parallel to the longitudinal axis, and the inner perimetrical surface by which the first cell is held in a direction substantially parallel to the longitudinal axis.

In the cell box according to the above aspect of the present invention, either the first cell or the second cell is more stably held in the cavity of the cell box.

According to another aspect of the present invention, the first cell has the positive and negative electrodes on the side surface thereof, the first internal electrodes are arranged near the perimetrical surface of the holder, the second cell has the positive electrode on the top surface thereof and the negative electrode on the bottom surface thereof, and the second internal electrodes are arranged near the first and second inner end surfaces of the casing.

At least one pack-type lithium cell is preferably used as the first cell, and at least one dry cell is preferably used as the second cell. When the first internal electrodes are arranged near the perimetrical surface of the holder, the first internal electrodes can be separated from the external terminals while the second cell is received in the cell box. According to this structure, a current supplied from the second cell never causes a short circuit through the first internal electrodes. In addition, the internal electrodes can be advantageously made small although the electrode positions of the first cell and the second cell are different from each other.

It is another object of the present invention to provide an optical apparatus having electrically driven equipment and a cell box, the electrically driven equipment receiving electric power from the cell box, and the cell box being the above-described cell box of the present invention.

According to still another aspect of the present invention, the optical apparatus has an image stabilizing function and comprises:

a casing, an objective system and an eyepiece system which are mounted on the casing, a gimbal which is attached to the casing through two axes of rotation, said axes intersecting at right angle with each other, so that said gimbal is capable of oscillating in both directions of tilting and panning, an erect prism which is located between the objective system and the eyepiece system and attached to the gimbal, a motor which is attached to the gimbal, an inertial rotor which is mounted on a rotating shaft of the motor, and said cell box which supplies electric power to said motor.

Since the optical apparatus of the present invention has the cell box of the present invention, either of two types of cells, including a pack-type lithium cell and a dry cell, which are different in shape from each other can be used.

Therefore, according to the optical apparatus of the present invention, for example, it becomes possible to use a pack-type lithium cell at ordinary times, and, when the pack-type lithium cell is used up in a region where such a pack-type lithium cell is hardly available, to use a dry cell which can be easily obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2A and 2B are side sectional and front sectional views of the cell box shown in FIG. 1, respectively, in which FIG. 2A is a sectional view taken along a line 2A—2A in FIG. 2B, and FIG. 2B is a sectional view taken along a line 2B—2B in FIG. 2A;

FIGS. 3A and 3B are side sectional and front sectional views of the casing of the cell box shown in FIG. 1, in which FIG. 3A is a sectional view taken along a line 3A—3A in FIG. 3B, and FIG. 3B is a sectional view taken along a line 3B—3B in FIG. 3A;

FIGS. 4A and 4B are front sectional and bottom views of the cell-positioning holder of the cell box shown in FIG. 1, in which FIG. 4A is a sectional view taken along a line 4A—4A in FIG. 4B;

FIGS. 8A and 8B are side sectional and front sectional views of the cell box shown in FIG. 7, respectively, in which FIG. 8A is a sectional view taken along a line 8A—8A in FIG. 8B, and FIG. 8B is a sectional view taken along a line 8B—8B in FIG. 8A;

FIGS. 11A and 11B are front sectional views of another cell box according to the present invention, in which FIG. 11A is one receiving the first cell, and FIG. 11*b* is one receiving the second cell;

FIGS. 12A and 12B are front sectional views of still another cell box according to the present invention, in which FIG. 12A is one receiving the first cell, and FIG. 12B is one receiving the second cell;

DESCRIPTION OF THE PREFERRED EMBODIMENTS

Figure 1:
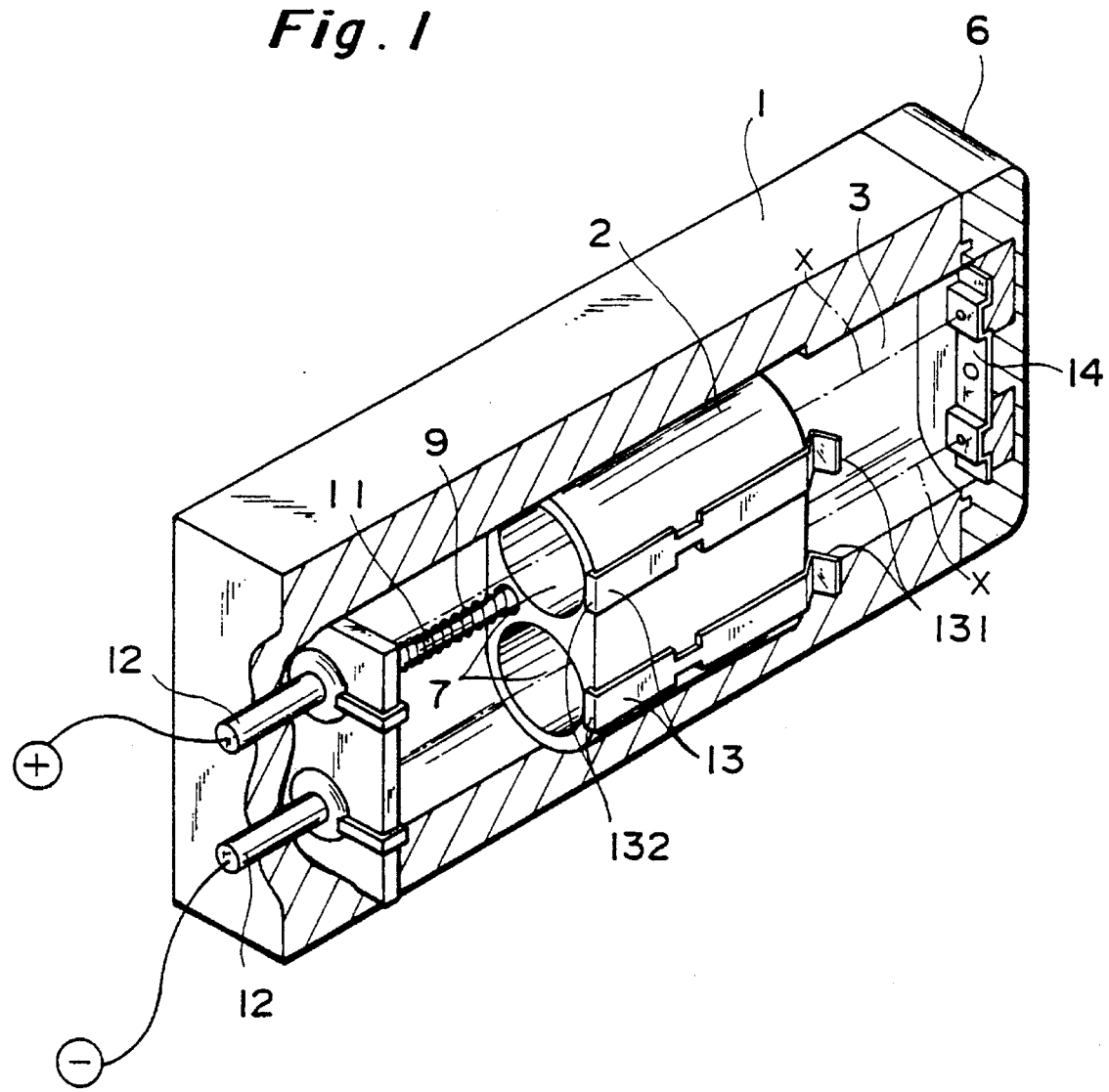
FIG. 1 is a partially cutaway perspective view of a cell box according to the present invention.

Embodiments of the present invention will be described below with reference to the accompanying drawings. The same reference numerals denote the same parts throughout the drawings.

An embodiment of the cell box according to the present invention will be described below with reference to FIGS. 1, 2A, 2B, 3A, 3B, 4A, 4B, 5 and 6.

Figure 2A:
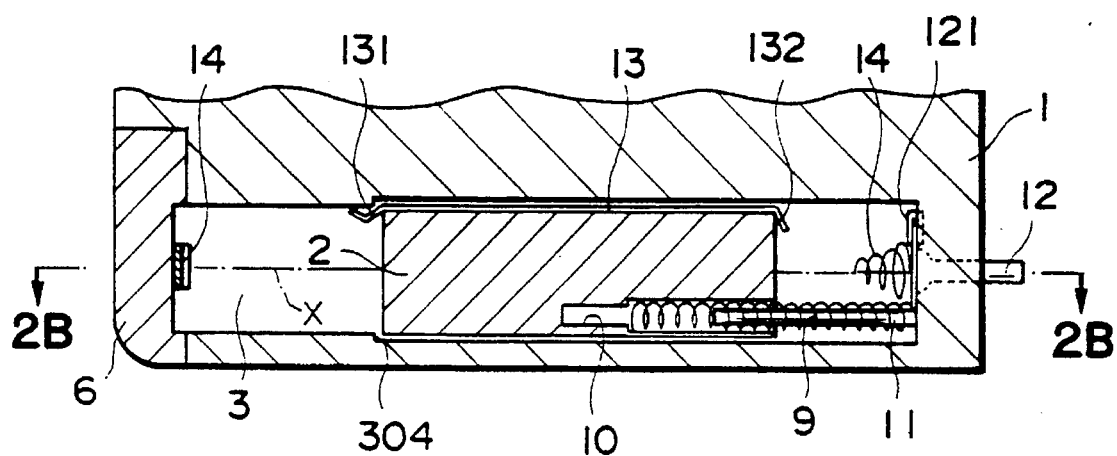
Figure 2B:
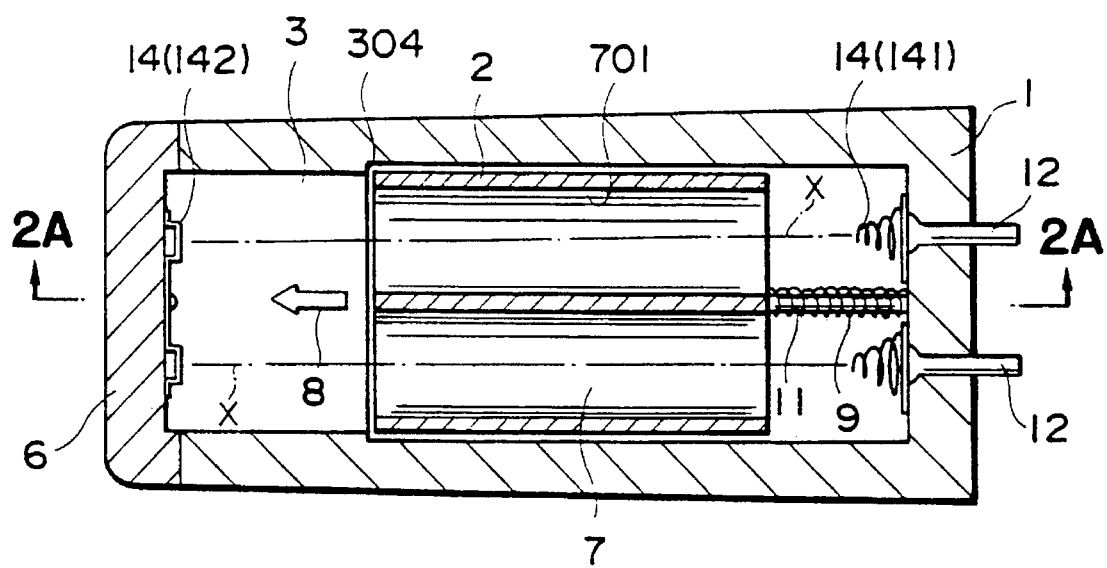

As shown in FIGS. 1, 2A, and 2B, the cell box of the present invention has a casing 1 and a cell-positioning holder 2.

Figure 3A:
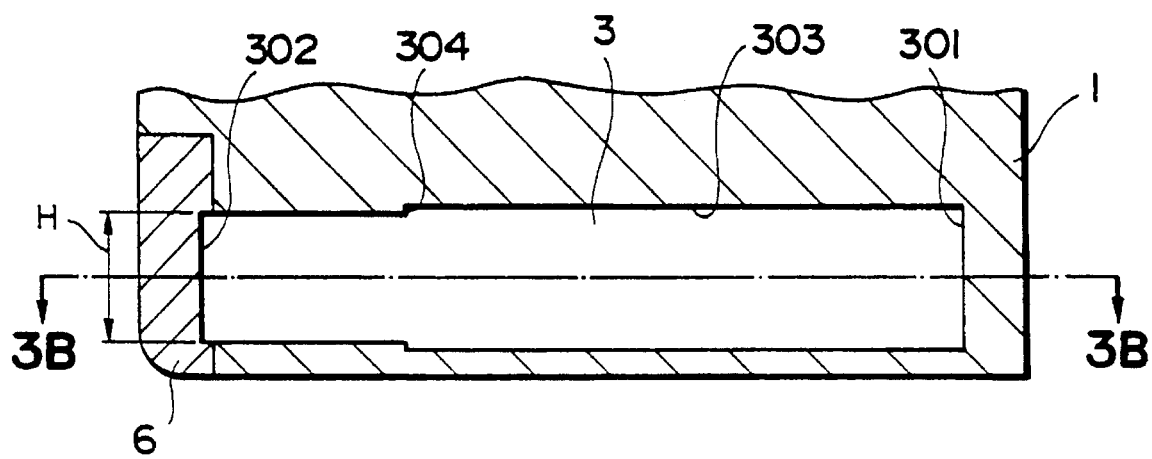
Figure 3B:
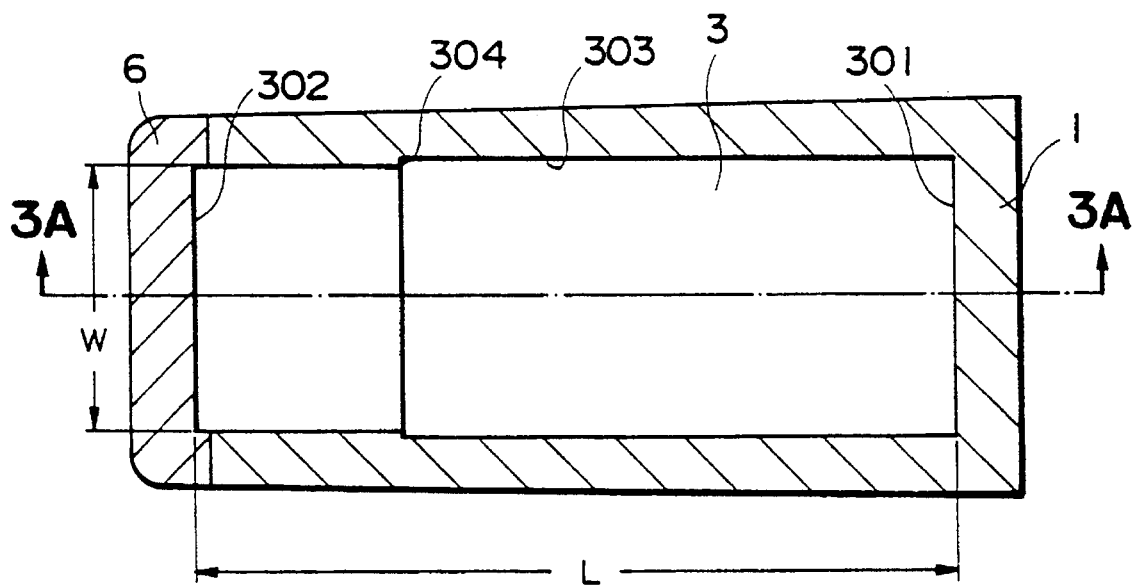
Figures 4A, 4B:
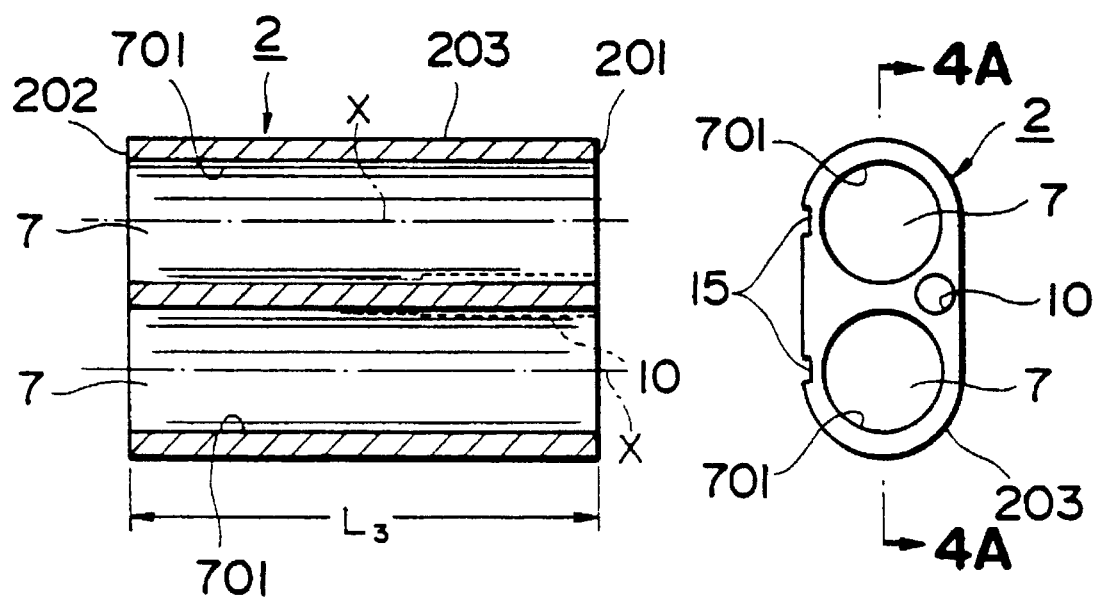
Figure 5:
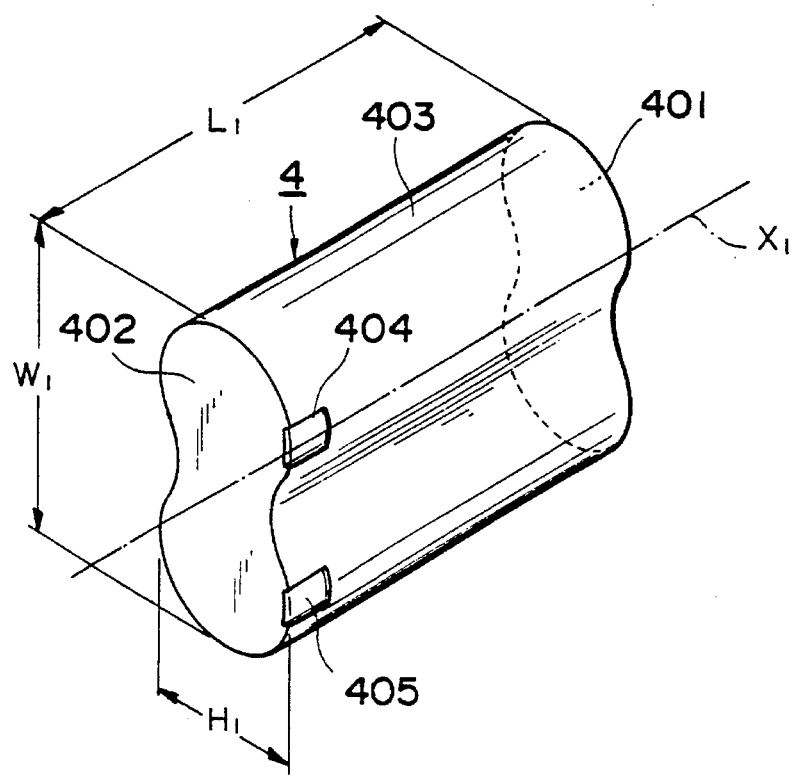
FIG. 5 is a perspective view of a first cell according to the present invention.
Figure 6:
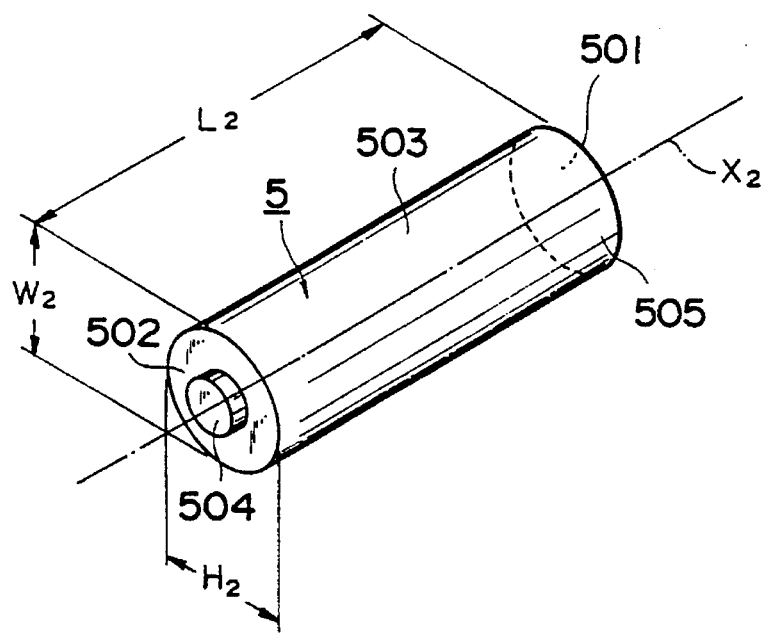
FIG. 6 is a perspective view of a second cell according to the present invention.

The casing 1 according to the present invention has a cavity 3 therein, as shown in FIGS. 3A and 3B, and the cell-positioning holder 2 as shown in FIGS. 4A and 4B is arranged in the cavity 3. The cavity 3 has a size capable of receiving either at least one first cell (e.g., a pack-type lithium cell) 4 which has a bottom surface 401, a top surface 402 and a side surface 403 as shown in FIG. 5, or at least one second cell (e.g., an AA dry cell) 5 which has a bottom surface 501, a top surface 502 and a side surface 503 as shown in FIG. 6. As shown in FIGS. 5 and 6, the first cell 4 and the second cell 5 are different in shape from each other, and, specifically, the bottom surface 501 and the top surface 502 of the second cell 5 are smaller than the bottom surface 401 and the top surface 402 of the first cell 4.

Further, the cell-positioning holder 2 has at least one through hole 7 which is capable of receiving a part of the second cell 5 and has a longitudinal axis shown as an axis X in FIGS. 1, 2A, 2B and 4A. In this embodiment, either the first cell 4 or the second cell 5 is received in the cavity 3 such that an axis $X_1$ of the first cell 4 shown in FIG. 5 or an axis $X_2$ of the second cell 5 shown in FIG. 6 becomes substantially parallel to the axis X.

The casing 1 according to the present invention will be described in more detail.

In this embodiment, the cavity 3 of the casing 1 is defined by a first inner end surface 301 of the casing 1, a second inner end surface 302 facing to the first inner end surface 301, and an inner perimetrical surface 303 defining an interval between the first inner end surface 301 and the second inner end surface 302. Further, the inner perimetrical surface 303 is along or parallel to the longitudinal axis X of the through hole 7.

The size of the cavity 3, that is a width W and a height H of the first inner end surface 301 (the second inner end surface 302) and an interval L between the first inner end surface 301 and the second inner end surface 302, is appropriately selected in accordance with the sizes and numbers of first cells 4 and second cells 5 to be received in the cavity 3.

As an exemplification, a case will be described below in which the cavity 3 can receive either m×n first cells 4 or p×q second cells 5. Note that m and n respectively represent the numbers of first cells 4 parallelly and serially arranged in the cavity 3 while p and q respectively represent the numbers of second cells 5 parallelly and serially arranged in the cavity 3. All these numbers are integers of 1 or more.

In this case, the width W is larger than m times a width $W_1$ of the bottom surface 401 (the top surface 402) of the first cell 4. Further, the height H is larger than an integer multiple of a height $H_1$ of the bottom surface 401 (the top surface 402) of the first cell 4. In this embodiment, since the bottom surface 501 (the top surface 502) of the second cell 5 are smaller than the bottom surface 401 and the top surface 402 of the first cell 4, the number (p) of second cells 5 capable of being parallelly arranged in the cavity 3 is m or more.

The width W is preferably almost equal to m times the width $W_1$ to substantially eliminate play when the first cell 4 is contained in the cavity 3. Further, the height H is preferably almost equal to an integer multiple of the height $H_1$ to substantially eliminate perpendicular play. According to the above structure, the first cell 4 is held in a direction substantially parallel to the longitudinal axis X by the inner perimetrical surface 303 of the casing 1.

Additionally, the interval L is larger than q times a length $L_2$ of the second cell 5. The interval L must also be larger than n times a length $L_1$ of the first cell 4.

The interval L is preferably almost equal to q times the length $L_2$ to substantially eliminate play when the second cell 5 is inserted in the cavity 3. According to the above structure, the second cell 5 is held in a direction of or parallel to the longitudinal axis X between the first inner end surface 301 and the second inner end surface 302 of the casing 1.

In this embodiment, the first inner end surface 301 and the second inner end surface 302 of the casing 1 are larger than the bottom surface 401 and the top surface 402 of the first cell 4. The bottom surface 401 (the top surface 402) of the first cell (pack-type lithium cell) 4 has a size larger than the total size of the bottom surfaces 501 (the top surfaces 502) of two second cells (AA dry cells) 5 which are parallelly arranged. For this reason, the first inner end surface 301 and the second inner end surface 302 of the casing 1 are larger than the bottom surface 401 (the top surface 402) of one first cell 4 and also larger than the total size of the bottom surfaces 501 (the top surfaces 502) of two second cells 5.

Further, the interval L between the first inner end surface 301 and the second inner end surface 302 of the casing 1 is larger than twice the length $L_2$ of the second cell 5. A length corresponding to twice the length of the second cell (AA dry cell) 5 is larger than the length $L_1$ of the first cell (pack-type lithium cell) 4. For this reason, the interval L of the casing 1 is larger than the length $L_1$ of one first cell 4 and also larger than the total length ($L_2 \times 2$) of two second cells 5.

Therefore, the cavity 3 in the casing 1 of this embodiment can receive either one first cell 4 (m=n=1) or four second cells 5 (p=q=2).

The casing 1 partially constitutes a lid portion 6 for exchanging cells. The lid portion 6 can be freely opened/closed to receive the first cell 4 or the second cell 5 therethrough. In this embodiment, the lid portion 6 is formed at a portion including the second inner end surface 302 of the casing 1. However, the lid portion 6 may also be formed at a portion including the first inner end surface 301 and/or the inner perimetrical surface 303 of the casing 1.

The cell-positioning holder (sleeve) 2 according to the present invention will be described in more detail.

The holder 2 is arranged in the cavity 3, as shown in FIGS. 1, 2A, and 2B. In this embodiment, the holder 2 has a first end surface 201 facing to the first inner end surface 301 of the casing 1, a second end surface 202 being opposite to the first end surface 201, and a perimetrical surface 203 continued from the first end surface 201 to the second end surface 202. Additionally, as shown in FIGS. 4A and 4B, the holder 2 has through holes (opening portions) 7 for receiving the second cells 5 therethrough. The perimetrical surface 202 is perpendicular the longitudinal axis X of the through holes 7.

In this embodiment, when the first cell 4 is received in the cavity 3, the first cell 4 is held in a direction parallel the longitudinal axis X between the second end surface 202 of the holder 2 and the second inner end surface 302 of the casing 1, while, when the second cells 5 are received in the cavity 3, a part of the second cells 5 are held in a direction substantially vertical to the longitudinal axis X by an inner surface 701 defining the through hole 7 of the holder 2.

The holder 2 is slidably arranged in at least a part of the cavity 3 in a direction or parallel to the longitudinal axis X. More specifically, at least a part of the perimetrical surface 203 of the holder 2 preferably slidably contacts the inner perimetrical surface 303 of the casing 1. In this embodiment, the first end surface 201 and the second end surface 202 of the holder 2 have almost the same size as that of the bottom surface 401 (the top surface 402) of the first cell 4.

A distance $L_3$ between the first end surface 201 and the second end surface 202 of the holder 2 is preferably almost equal to a value obtained upon subtracting an integer multiple (n times) of the length $L_1$ of the first cell 4 from the interval L of the casing 1. According to this structure, play in the direction of the longitudinal axis X is substantially eliminated when the first cell 4 is received in the cavity 3. In this embodiment, the distance $L_3$ of the holder 2 is almost the same as a value obtained upon subtracting the length $L_1$ of the first cell 4 from the interval L of the casing 1.

At least a part of the inner surface 701 of the through hole 7 preferably slidably contacts the side surface 503 of the second cell 5. According to this structure, at least a part of the side surface 503 of the second cell 5 is properly held by the holder 2 and positioned. In this embodiment, the through hole 7 has almost the same size as that of the bottom surface 501 (the top surface 502) of the second cell 5.

The number of through holes 7 is the same as the number (p) of second cells 5 which are parallelly arranged in the cavity 3. In this embodiment, two through holes 7 are formed, and, two second cells 5 are inserted in each of the two through holes 7. However, one or three or more through holes may also be formed. Further, the number of second cells 5 to be inserted in each of the through holes 7 may be one, or more preferably, two or more.

Energizing means according to the present invention will be described.

The holder 2 according to this embodiment is energized by energizing means in a direction of the longitudinal axis X (in a direction indicated by an arrow 8 in FIG. 2B). According to this structure, when the first cell 4 is received in the cavity 3, the first cell 4 is pressed against the second inner end surface 302 of the casing 1 by the holder 2. Further, when the second cell 5 is received in the cavity 3, the second end surface 202 of the holder 2 is pressed by the energizing means against a stopper (step) 304 formed on the inner perimetrical surface 303 of the casing 1, and, thus, the holder 2 is held in a direction of or parallel to the longitudinal axis X, as shown in FIGS. 2A and 2B.

In this embodiment, as the energizing means, a spring 9 is arranged with its one end contacting the first inner end surface 301 of the casing 1 and the other end contacting the holder 2. Further, a hole (narrow hole) 10 is bored from the first end surface 201 of the holder 2 in a direction substantially parallel to the longitudinal axis X. Furthermore, a shaft 11 projects from the first inner end surface 301 of the casing 1 in a direction substantially parallel to the longitudinal axis X. The spring 9 is arranged around the shaft 11, and, at least parts of the spring 9 and the shaft 11 are inserted in the hole 10. According to this structure, the holder 2 is energized while maintaining a predetermined energizing direction.

The energizing means is not limited to the spring and may also be constituted by another elastic body. The position where the energizing means is attached is also not limited to the position shown in the drawings.

Electrodes according to the present invention will be described.

The cell box of the present invention has electrodes for externally outputting electric power output from either the first cell 4 or the second cell 5. More specifically, electrodes according to the present invention comprise, as shown in FIGS. 2A and 2B, positive and negative external terminals 12 for externally outputting electric power from the cell box; first internal electrodes 13 each having one end connected to a positive electrode 404 or a negative electrode 405 of the first cell 4 and the other end connected to the positive or negative external terminal 12; and second internal electrodes 14 each having one end connected to a positive electrode 504 or a negative electrode 505 of the second cell 5 and the other end connected to the positive or negative external terminal 12.

In this embodiment, the first cell 4 has the positive electrode 404 and the negative electrode 405 on the side surface 403, as shown in FIG. 5. Therefore, the first internal electrodes 13 are arranged in grooves 15 formed on the perimetrical surface 203 of the holder 2, as shown in FIGS. 2A and 4B. When the first cell 4 is received in the cavity 3, one end 131 of each of the first internal electrodes 13 is connected to the positive electrode 404 or the negative electrode 405 of the first cell 4, while the other end 132 of each of the first internal electrodes 13 is connected to the positive or negative external terminal 12 through an end portion 121 of each of the external terminals 12.

On the other hand, the second cell 5 has the positive electrode 504 on the top surface 502 and the negative electrode 505 on the bottom surface 501, as shown in FIG. 6. Therefore, the second internal electrodes 14 are arranged on the first inner end surface 301 and the second inner end surface 302 of the casing 1, as shown in FIG. 2B. When the second cell 5 is received in the cavity 3, the positive electrode 504 and the negative electrode 505 of the second cell 5 are connected to the positive and negative external terminals 12 through the second internal electrodes 14, respectively.

Further, the first internal electrodes 13 are separated from the external terminals 12 while the second cell 5 is received. For this reason, a current supplied from the second cell 5 never causes a short circuit through the first internal electrodes 13.

In this embodiment, second internal electrodes 141 arranged on the first inner end surface 301 are spring-like electrodes. According to this structure, the second cells 5 received in the cavity 3 are energized by these second internal electrodes 141 in a direction indicated by the arrow 8 in FIG. 2B, and properly held between the second internal electrodes 141 and the second internal electrodes 142 arranged on the second inner end surface 302.

Figure 7:
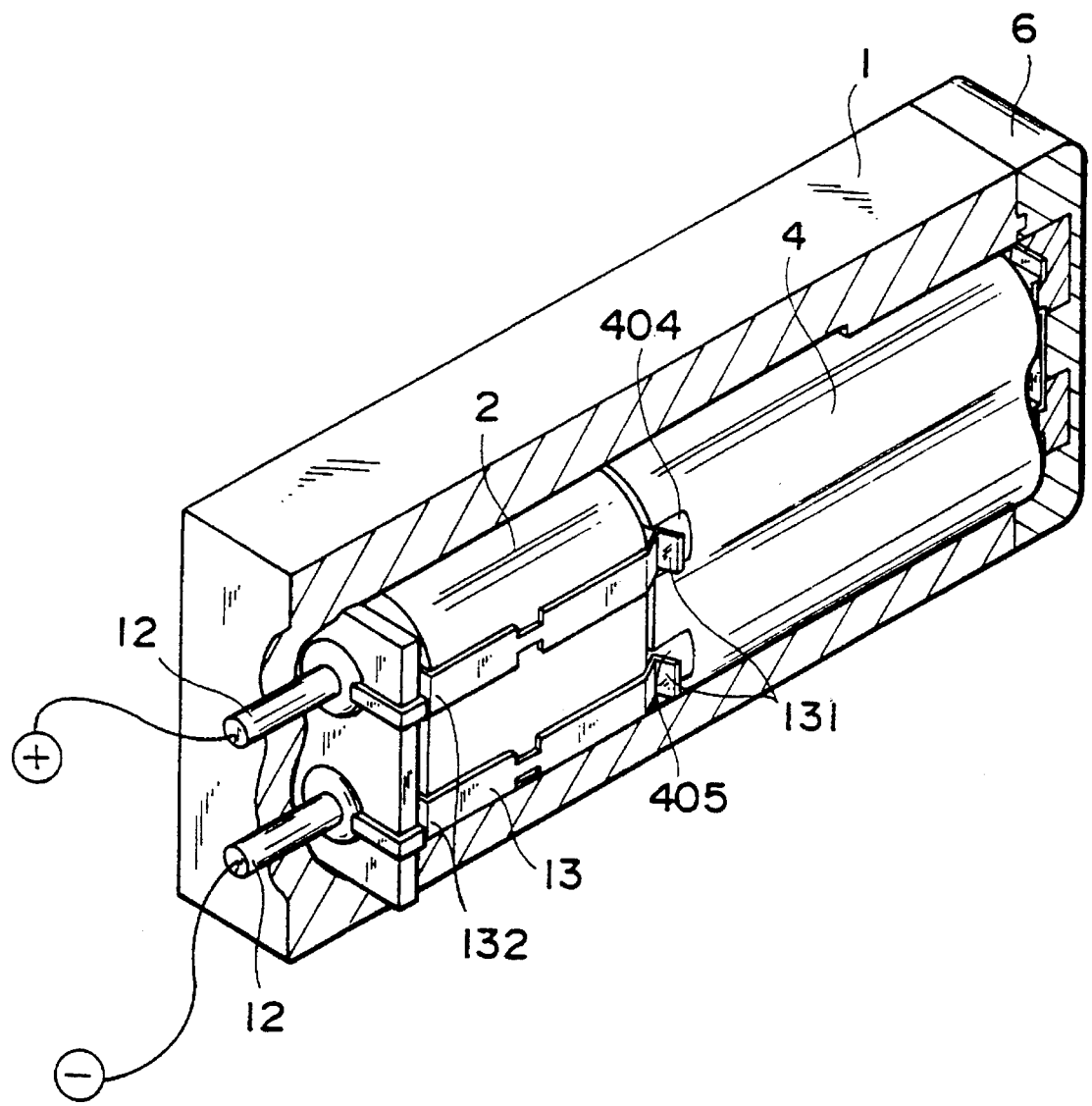
FIG. 7 is a partially cutaway perspective view of the cell box shown in FIG. 1, which receives the first cell shown in FIG. 5.
Figure 8A:
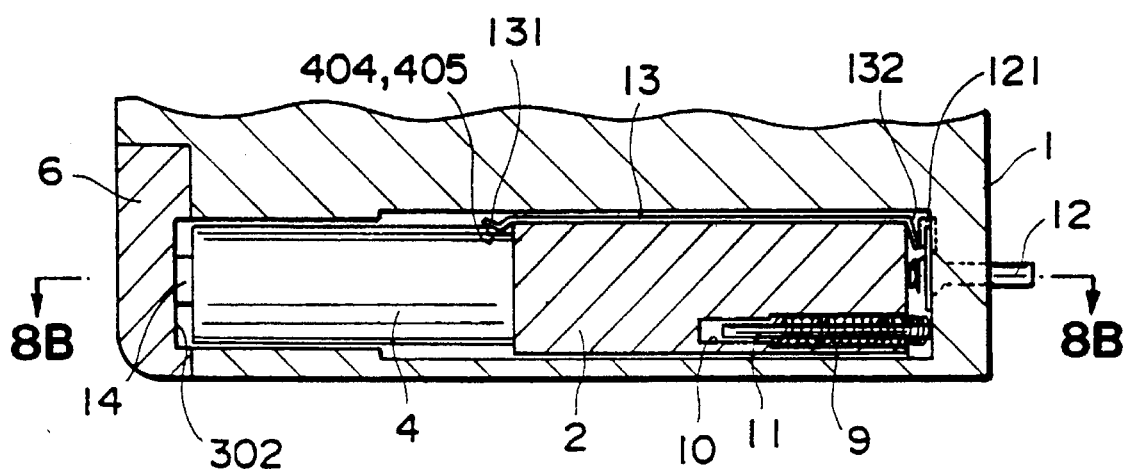
Figure 8B:
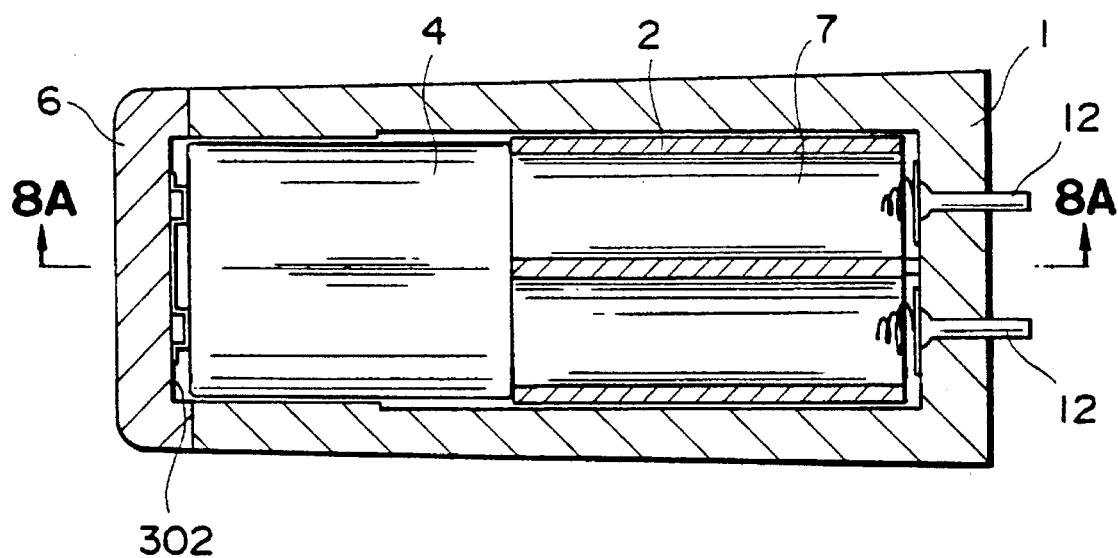

Reception of the first cell in the cell box of the present invention will be described hereinbelow with reference to FIGS. 7, 8A and 8B.

When the holder 2 is not subjected to an external force, the holder 2 is separated from the first inner end surface 301 of the casing 1 by the energizing means, and, the second end surface 202 of the holder 2 is in contact with the stopper (step) 304 formed on the inner perimetrical surface 303 of the casing 1, as shown in FIGS. 2A and 2B. According to this structure, the holder 2 is arranged at an almost center of the cavity 3.

To use the first cell 4, the lid portion 6 is opened to insert the first cell 4 into the cavity 3. After the first cell 4 is brought into contact with the second end surface 202 of the holder 2, the first cell is further pressed into the cavity 3. At this time, the spring 9 is compressed to cause the holder 2 to slide toward the first inner end surface 301 of the casing 1, thereby completely receiving the first cell 4 in the cavity 3. When the lid portion 6 is closed in this state, a state shown in FIGS. 7, 8A and 8B is obtained.

The first cell 4 arranged in the cavity 3 in this manner is properly held between the second inner end surface 302 of the casing 1 and the second end surface 202 of the holder 2. Further, the positive electrode 404 of the first cell 4 is brought into contact with the one end 131 of the corresponding first internal electrode 13, since the holder 2 is pressed by the first cell 4 and moved to the first inner end surface 301 of the casing 1, the other end 132 of the first internal electrode 13 is brought into contact with the end portion 121 of the corresponding external terminal 12 (positive electrode). In this manner, the positive electrode 404 of the first cell 4 is rendered conductive with the corresponding external terminal 12 (positive electrode). Similarly, the negative electrode 405 of the first cell 4 is rendered conductive with the corresponding external terminal 12 (negative electrode) through the corresponding first internal electrode 13. Therefore, electric power can be externally supplied from the positive and negative electrodes of the external terminals 12.

Figure 9:
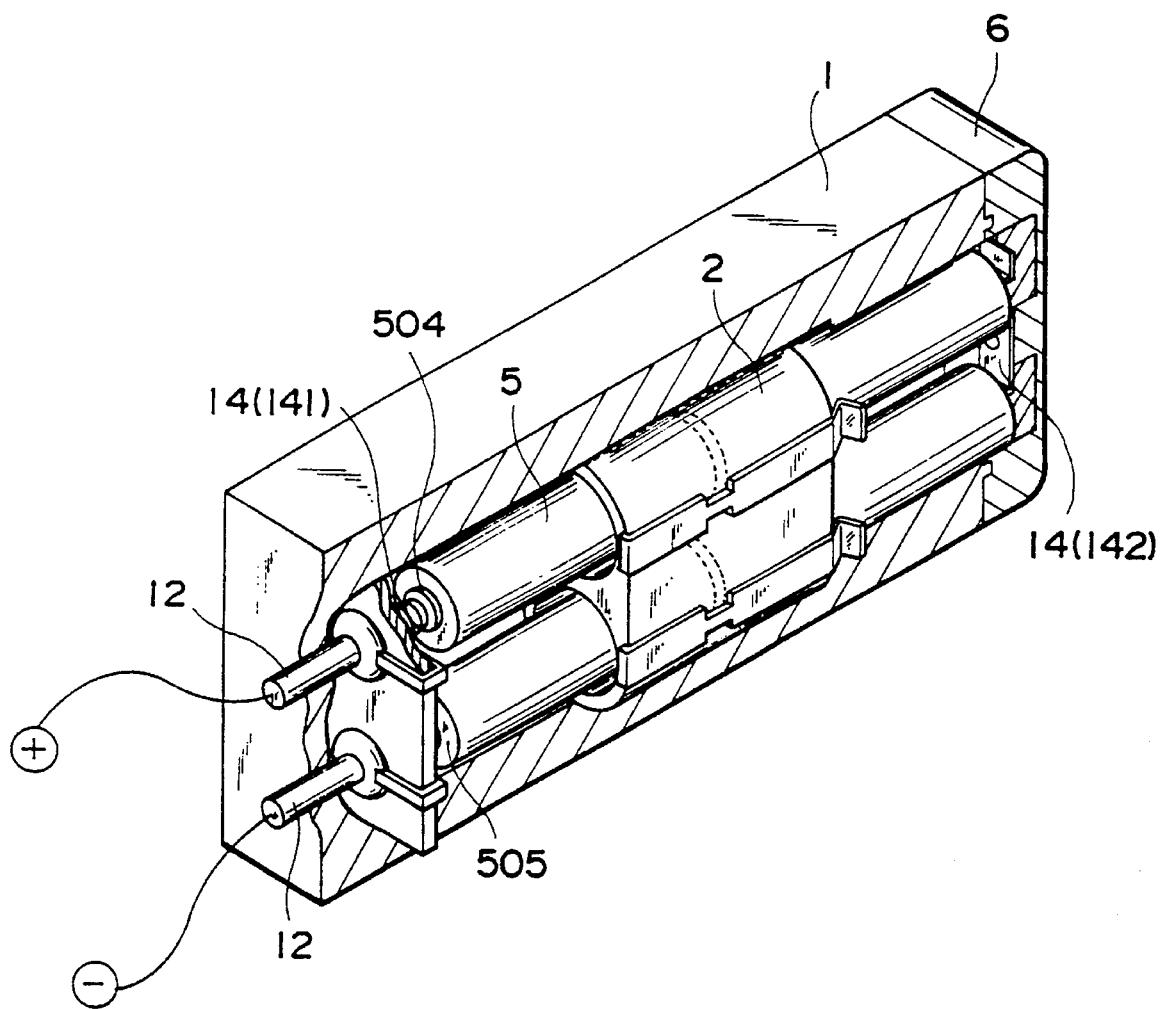
FIG. 9 is a partially cutaway perspective view of the cell box shown in FIG. 1, which receives the second cell shown in FIG. 6.
Figure 10:
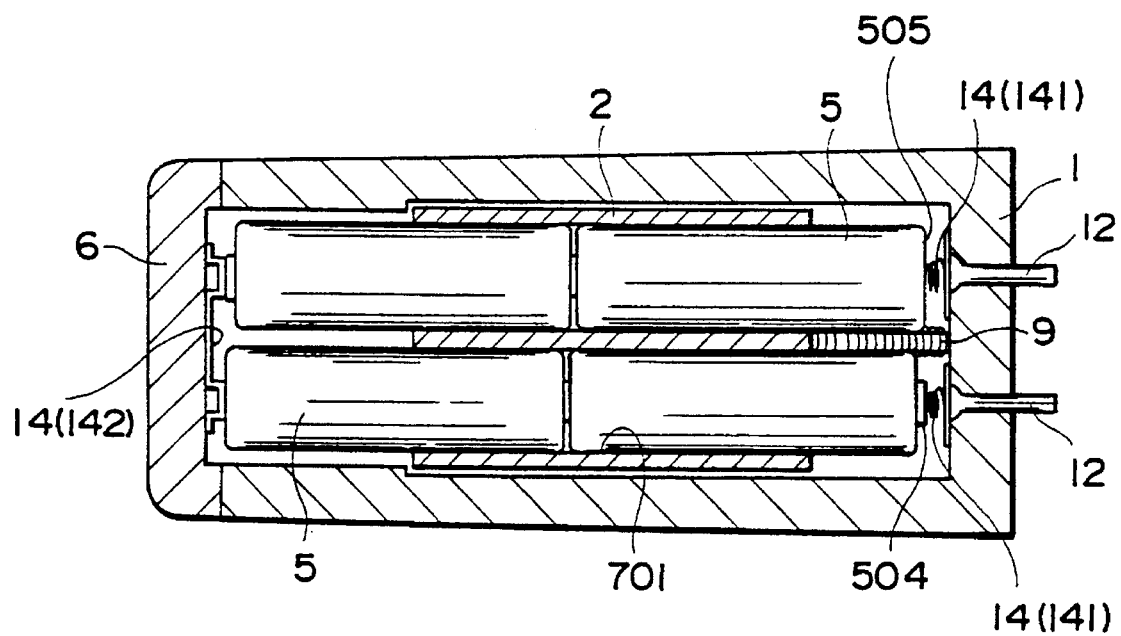
FIG. 10 is a front sectional view of the cell box shown in FIG. 9.

Reception of the second cell in the cell box of the present invention will be described hereinbelow with reference to FIGS. 9 and 10.

To use the second cell 5, the lid portion 6 is opened to insert the second cell 5 into the through hole 7 of the holder 2 arranged in the cavity 3. In this embodiment, two second cells 5 are inserted in each of the two through holes 7, i.e., a total of four second cells 5 are inserted. When the lid portion 6 is closed in this state, a state shown in FIGS. 9 and 10 is obtained. In this state, the holder 2 is maintained at the almost center of the cavity 3.

The second cells 5 arranged in the cavity 3 in this manner are properly held by the inner surface 701 of the holder 2 by at least a part of their side surfaces 503. In this embodiment, the size of the through hole 7 is almost the same as that of the bottom surface 501 (the top surface 502) of the second cell 5. In addition, the one electrode 141 of the second internal electrodes 14 is a spring electrode. Therefore, the second cells 5 are held in the through hole 7 without any large movement.

The second cells 5 arranged in the cavity 3 are serially connected though the second internal electrodes 142 arranged on the second inner end surface 302 of the casing 1. Further, the positive and negative electrodes 504 and 505 of the second cells 5 are connected to the external terminals 12 through the second internal electrodes 141 arranged on the first inner end surface 301. Therefore, the current flows from the upper second internal electrode 141 in FIG. 10 to the lower second internal electrode 141 through the two upper second cells 5, the second internal electrodes 142 attached to the lid portion 6, and the two lower second cells 5. In this manner, electric power can be externally supplied from the positive and negative electrodes of the external terminals 12.

As in this embodiment, when at least two second cells 5 which are serially arranged are to be received in each of the through holes 7, the holder 2 preferably holds the contact portion between the second cells 5.

The pack-type lithium cell used in the above embodiment as the first cell 4 has a voltage of 6 V, while the AA dry cell used as the second cell 5 has a voltage of 1.5 V. Therefore, as described above, either one first cell 4 or four second cells 5 serially connected are used to apply a voltage of 6 V between the positive and negative electrodes of the external terminals 12. In the present invention, the voltage of the to-be-used first cell 4 or the to-be-used second cell 5 and the number and connection method thereof are preferably appropriately selected to apply a predetermined voltage between the positive and negative electrodes of the external terminals 12.

The preferred embodiment of the cell box of the present invention has been described above. However, the cell box of the present invention is not limited to the above embodiment, as a matter of course. In the above embodiment, a pack-type lithium cell and an AA dry cell are used as the first and second cells received in the cell box, respectively. However, the first and second cells are not limited to those, and a combination of other cells may also be used. In the above embodiment, either one first cell or four second cells are received in the cell box. However, the numbers of first and second cells are not limited to those.

Figure 11A:
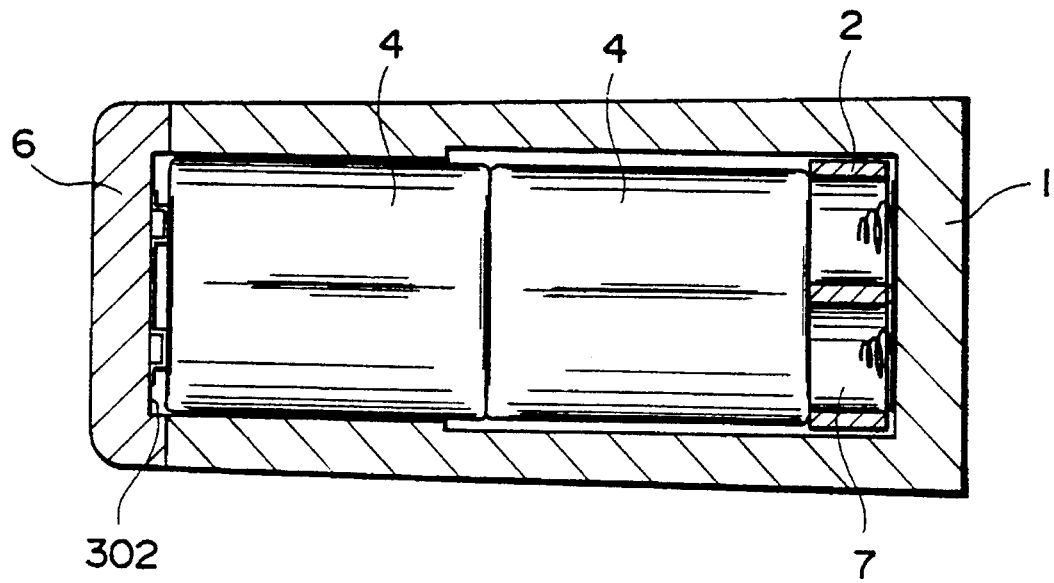
Figure 11B:
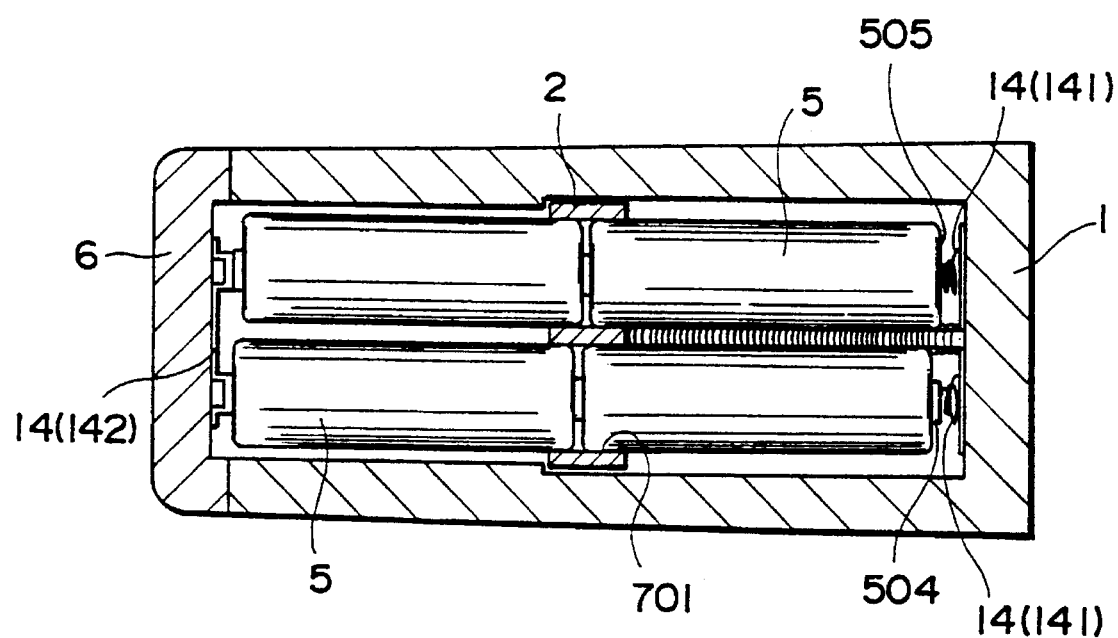

As shown in FIGS. 11A and 11B, either two first cells 4 or four second cells 5 may be received in the cell box. In this case, the distance $L_3$ of the holder 2 is almost the same as a value obtained upon subtracting a two-fold value of the length $L_1$ of the first cell 4 from the interval L of the cavity 3. The two first cells 4 are parallelly connected to each other through first internal electrodes (not shown), while the four second cells 5 are serially connected to each other through the second internal electrodes 14. In either case, a voltage of 6 V is applied between the positive and negative electrodes of external terminals (not shown).

Figure 12A:
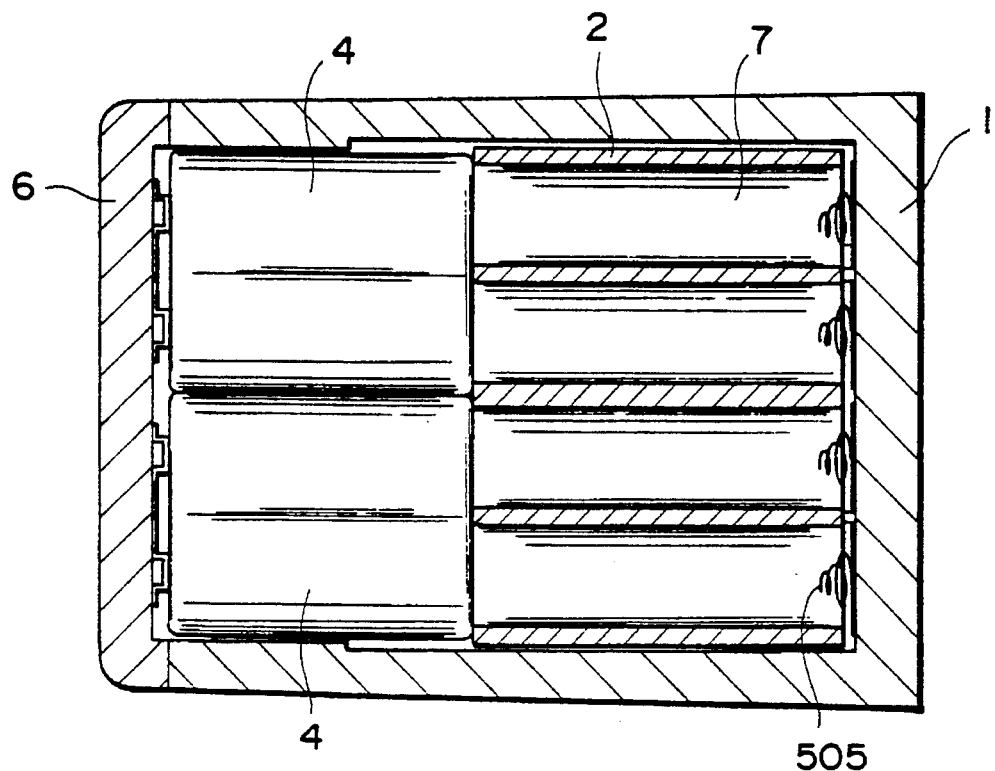
Figure 12B:
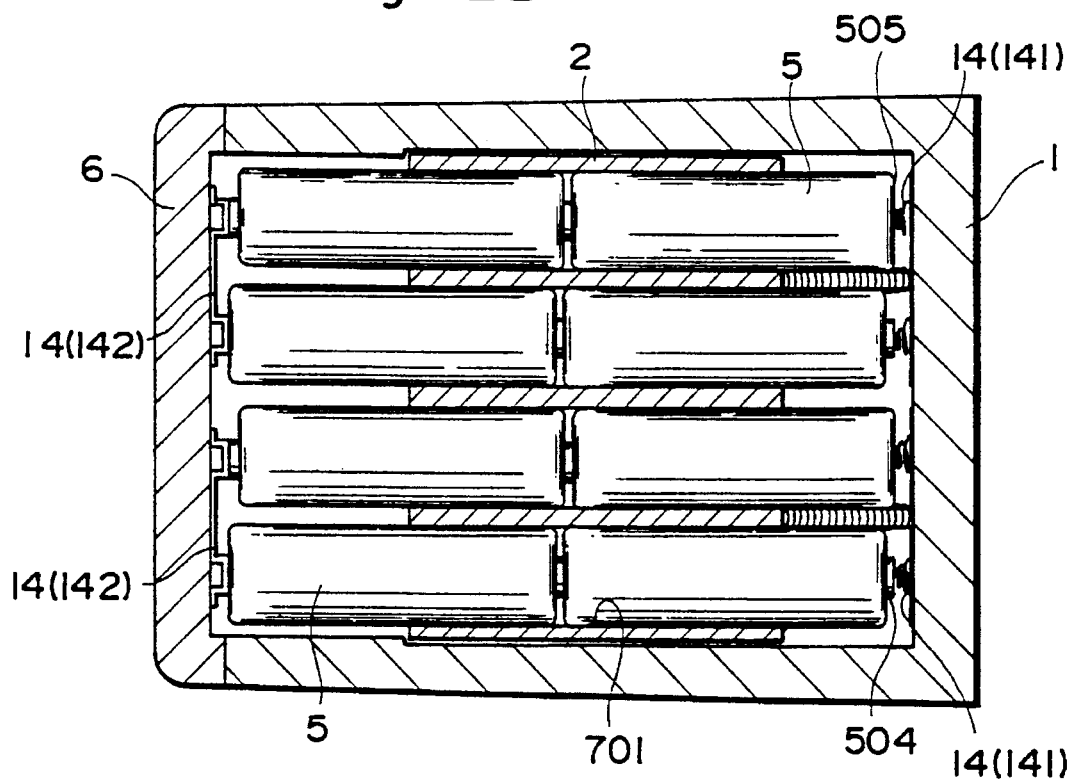

In addition, as shown in FIGS. 12A and 12B, either two first cells 4 or eight second cells 5 may be received in the cell box. In this case, the width w of the second inner end surface 302 is almost twice the width $W_1$ of the first cell 4. The holder 2 has four through holes 7. The two first cells 4 are serially connected to each other through first internal electrodes (not shown), while the eight second cells are serially connected to each other through the second internal electrodes 14. In either case, a voltage of 12 V is applied between the positive and negative electrodes of external terminals (not shown).

An optical equipment of the present invention, which uses the cell box of the present invention, will be described below with reference to FIGS. 13 and 14.

The cell box of the present invention can use either of two types of cells, including a pack-type lithium cell and a dry cell, which are different in shape from each other. Since this cell box is also compact and handy, it can be used for various apparatuses having electrically driven equipment, and more preferably, apparatuses which consume a relatively large electric power. Particularly, this cell box is preferably used for an optical apparatus having an electrically driven equipment.

The optical apparatus of the present invention has an electrically driven equipment and the cell box of the present invention. Electric power is supplied from the cell box to the electrically driven equipment. More specifically, the external terminals of the cell box are connected to the electrically driven equipment, and electric power is supplied from a first or second cell received in the cell box to the electrically driven equipment through the external terminals. The remaining structure of the optical apparatus of the present invention is not particularly limited. The connecting means for connecting the external terminals to the electrically driven equipment is also not particularly limited. Since the optical apparatus of the present invention has the cell box of the present invention, either of two types of cells, including a pack-type lithium cell and a dry cell, which are different in shape from each other, can be used.

Such optical apparatuses include a binocular, a camera, a telescope and a video camera which have an electrically driven equipment (e.g., an image stabilizing system). Particularly, when the cell box of the present invention is used for a binocular with an image stabilizing function, which requires portability and expects outdoor use for a long time, advantages achieved by the present invention can be obtained at maximum.

A binocular with an image stabilizing function of the present invention, which has the cell box of the present invention, will be described hereinbelow.

Figure 13:
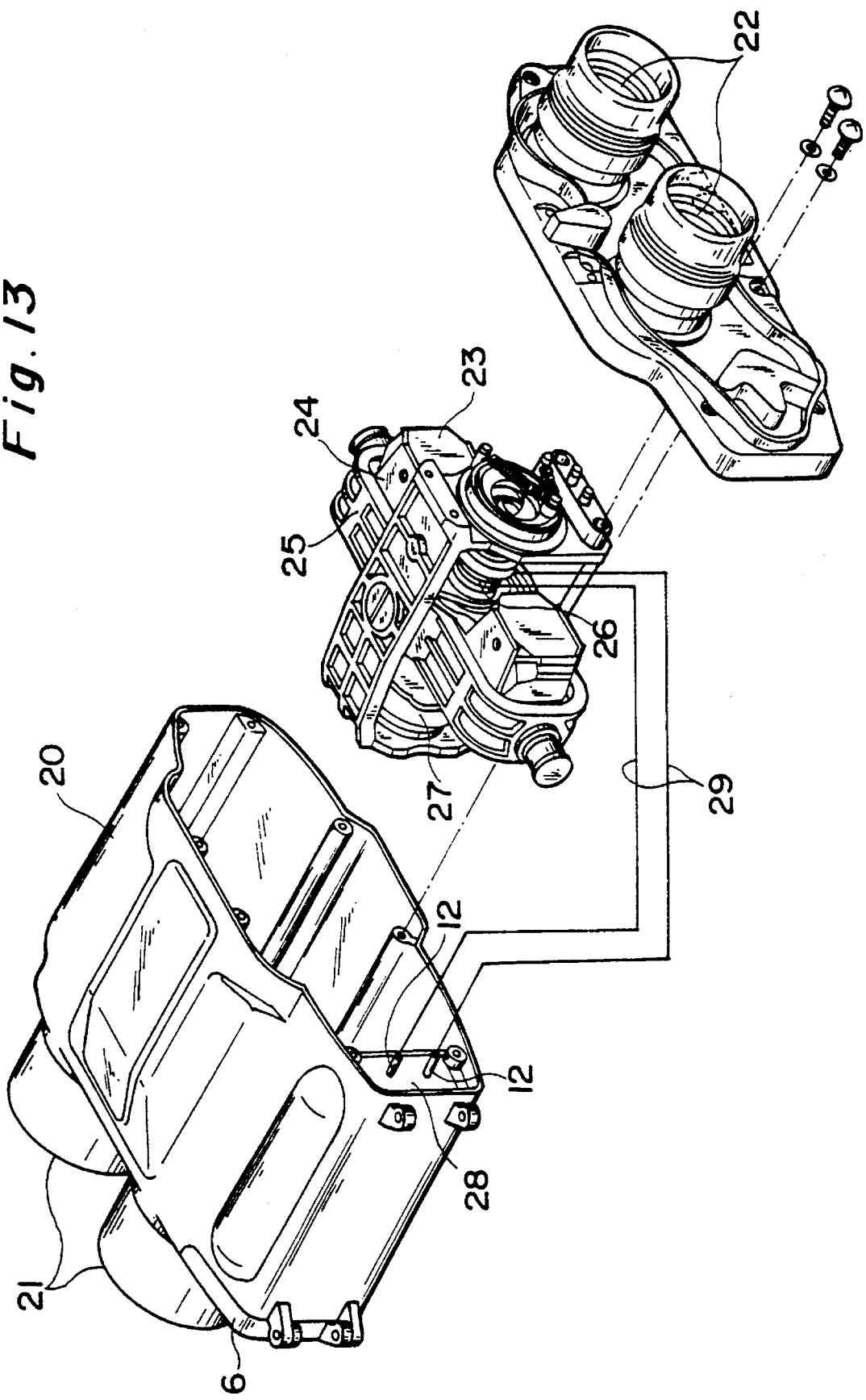
FIG. 13 is an exploded perspective view of an optical apparatus according to the present invention.
Figure 14:
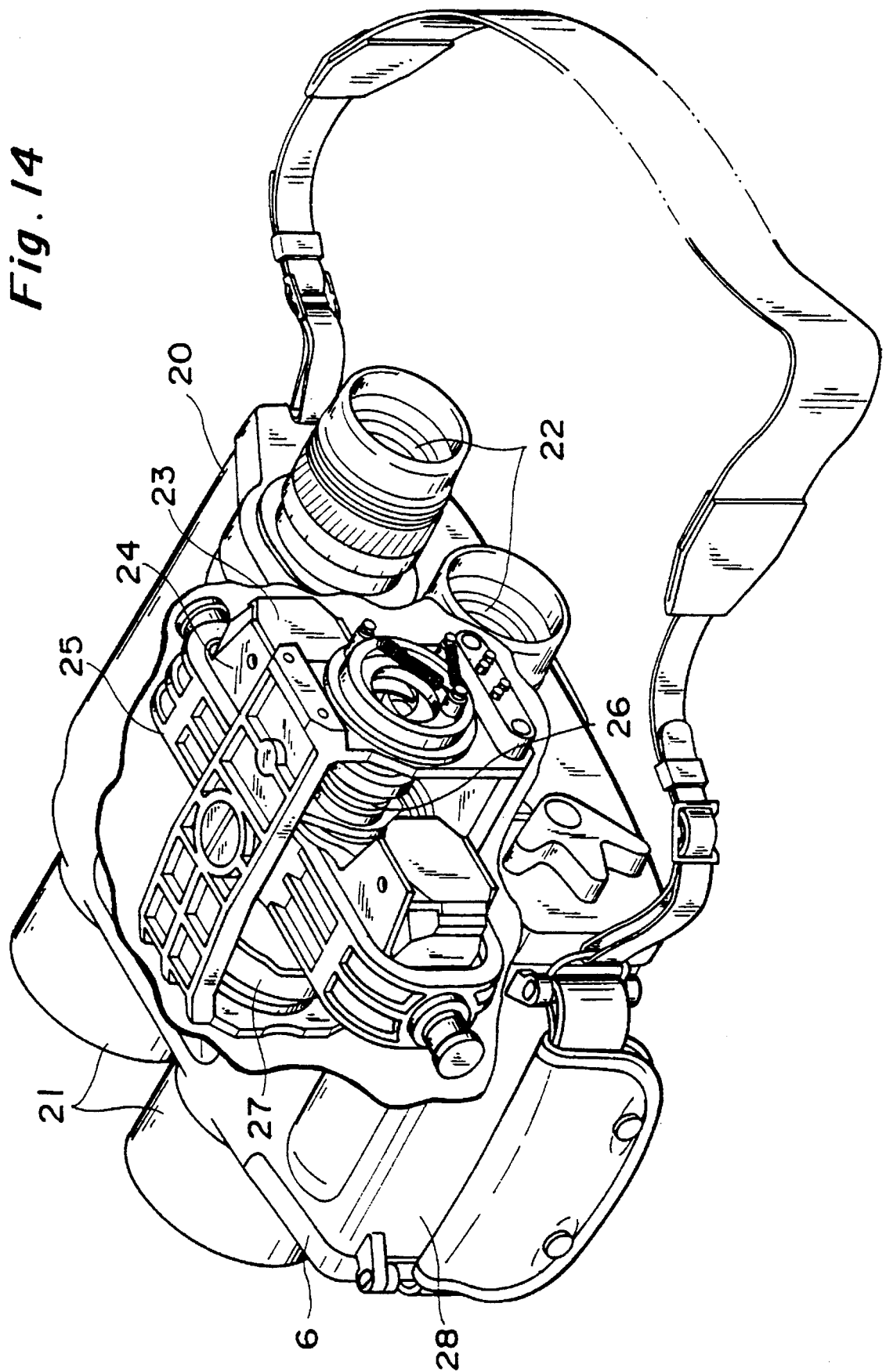
FIG. 14 is a partially cutaway perspective view of the optical apparatus shown in FIG. 13.

As shown in FIGS. 13 and 14, the image stabilized binocular of the present invention comprises:

a casing 20;

an objective system 21 and an eyepiece system 22 which are mounted on the casing;

a set of gimbals 24, 25 which is attached to the casing through two axes of rotation, said axes intersecting at right angle with each other in a plane substantially perpendicular to the optical axes of the objective and eyepiece systems 21, 22, so that the gimbal 24 is capable of oscillating in both directions of tilting and panning;

an erect prism 23 which is located between the objective system 21 and the eyepiece system 22 and attached to the gimbal 24;

a motor 26 which is attached to the gimbal 24;

an inertial rotor 27 which is mounted on a rotating shaft (not shown) of the motor 26; and the cell box 28 of the present invention.

The erect prism 23, the motor 26 and the inertial rotor 27 are integrally attached to the gimbal or connected to each other by linking such that they always point in the same direction. The external terminals 12 of the cell box 28 are connected to the motor 26 by wiring lines 29, thereby supplying electric power from the cell box 28 to the motor 26. According to this structure, the binocular of the present invention exhibits its image stabilizing function. A switch of the motor 26 and the like are appropriately connected to the motor 26 or the wiring lines 29.

Such a binocular (without cell box) is described in, e.g., U.S. Pat. No. 4,235,506 (corresponding to Japanese Patent Publication No. 57-37852) whose assignee is the same as in this application. The contents of U.S. Pat. No. 4,235,506 are incorporated in this application by reference.

The binocular with the image stabilizing function of the present invention can use either of the two types of cells by opening the lid portion 6 of the cell box 28 to receive the first or second cell, as described above.

In this embodiment, the casing 1 of the cell box is integrally formed with the casing 20 of the binocular. However, the casing 1 of the cell box may be separable from the casing 20 of the binocular. The remaining structure of the binocular of the present invention is not particularly limited.

The binocular of the present invention is usable especially due to the following reasons.

In the binocular with the image stabilizing function, since the rotational speed of the inertial rotor is very high, the motor consumes a large electric power. In addition, this binocular is often used for outdoor observation, supervision, security, rescue or the like, so it cannot be supplied with electric power by connecting a power cord. Therefore, a pack-type lithium cell is generally used for this binocular. Furthermore, this binocular is also often used for outdoor observation in a low temperature environment. For this reason, the pack-type lithium cell usable at low temperatures can be advantageously used.

However, a pack-type lithium cell is not for general use but for relatively special use, so it cannot be easily obtained in some regions. Particularly in foreign countries, a pack-type lithium cell is often hardly available. Therefore, if a pack-type lithium cell is used up in a region where it is difficult to obtain a pack-type lithium cell, a dry cell can be conveniently used. Because of its high availability, a dry cell can be easily obtained not only in Japan but also in foreign countries.

If such a binocular can use either a pack-type lithium cell or a dry cell, it is very convenient. Therefore, the binocular of the present invention, which can use either a pack-type lithium cell (e.g., "2CR5" type) or an AA dry cell, is very useful. When four AA dry cells are serially connected to each other, a voltage of 6 V is obtained, which is the same as that of one lithium cell of the 2CR5 type. Therefore, a device such as a voltage adjustment device becomes unnecessary.

In this embodiment, a binocular with an image stabilizing function has been described. However, as described above, the cell box of the present invention can also be applied to other optical apparatus with an image stabilizing function, including a telescope and a camera. In addition, the cell box of the present invention may be applied to any apparatus including a binocular, a telescope and a camera which consume a relatively large electric power.

As has been described above, according to the present invention, a compact and handy cell box capable of receiving either of two types of cells, such as a pack-type lithium cell and a dry cell, which are different in shape from each other can be obtained. Therefore, according to the cell box of the present invention, it becomes possible to use one type of cell (e.g., pack-type lithium cell) at ordinary times, and, when this type of cell is used up in a region where this type of cell is rarely available, to use another type of cell (e.g., a dry cell) which can be easily obtained.

In addition, according to using the cell box of the present invention for a portable apparatus which consumes a relatively large electric power and is mainly used outdoors, such as an optical apparatus with an image stabilizing function, such an apparatus which is compact and capable of receiving two types of cells can be obtained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A cell box for receiving either a first cell or a second cell which are different in shape from each other, said cell box comprising:

a casing having a cavity for receiving either a first cell or a second cell, the first and second cells having different shapes, said cavity being defined by a first inner end surface of the casing, a second inner end surface facing the first inner end surface, and an inner perimetrical surface defining an interval between the first inner end surface and the second inner end surface, and a cell-positioning holder located in the cavity, said holder having a through hole for receiving part of a second cell and holding the second cell in a direction substantially parallel to a longitudinal axis of said through hole, and said holder having a first end surface facing said first inner end surface of the casing, a second end surface opposite the first end surface of said holder, and a perimetrical surface continued from the first to the second end surface of said holder, where a distance between said first and second end surfaces of said holder is substantially equal to a value obtained upon subtracting an integer multiple of a length of said first cell from said interval between the first inner end surface and the second inner end surface of the casing, so that a first cell is capable of being held between said second end surface of the holder and said second inner surface of the casing parallel to the longitudinal axis.

2. A box according to claim 1, further comprising energizing means for biasing said holder in a direction parallel to the longitudinal axis.

3. A box according to claim 1, further comprising a spring having one end contacting an inner, surface of the casing and another end contacting said holder, said spring being arranged in a direction substantially parallel to the longitudinal axis.

4. A box according to claim 1 wherein said holder has a hole aligned substantially parallel to the longitudinal axis, and said box further comprises a shaft having one end contacting an inner surface of the casing and another end inserted into the hole, said shaft aligned substantially parallel to the longitudinal axis.

5. A box according to claim 1, wherein said holder has a hole aligned substantially parallel to the longitudinal axis, and said box further comprises a shaft having one end contacting an inner surface of the casing and another end inserted into said hole, said shaft being arranged substantially parallel to said longitudinal axis, and a spring having one end contacting an inner surface of the casing and another end contacting said holder, said spring being arranged around said shaft.

6. A box according to claim 1, wherein said holder positions the first cell by pressing the first cell against the inner surface of the casing and positions the second cell by holding a part of a surface of the second cell.

7. A box according to claim 1, wherein the cavity is so shaped and arranged as to receive at least two second cells which are serially arranged, and said holder holds a contact portion between the at least two second cells.

8. A box according to claim 1, further comprising:

positive and negative external terminals for externally outputting electric power from said cell box, first internal electrodes for connecting positive and negative electrodes of the first cell to said positive and negative external terminals, respectively, and second internal electrodes for connecting positive and negative electrodes of the second cell to said positive and negative external terminals, respectively.

9. A box according to claim 1, wherein said inner perimetrical surface of said cavity is arranged parallel to the longitudinal axis of the through hole, and the perimetrical surface of said holder is arranged parallel to the longitudinal axis of the through hole.

10. A box according to claim 9, further comprising:

positive and negative external terminals for externally outputting electric power from said cell box, first internal electrodes for connecting positive and negative electrodes of the first cell to said positive and negative external terminals, respectively, said first internal electrodes being arranged near said perimetrical surface of said holder, and second internal electrodes for connecting positive and negative electrodes of said second cell to said positive and negative external terminals, respectively, said second internal electrodes being arranged near said first and second inner end surfaces of the casing.

11. A box according to claim 10 wherein the first cell has said positive and negative electrodes on a side surface thereof, and the second cell has said positive electrode on a top surface thereof and said negative electrode on a bottom surface thereof.

12. A box according to claim 1, wherein said casing has the first inner end surface and the second inner end surface between which the second cell is held aligned parallel to the longitudinal axis, and the inner perimetrical surface by which the first cell is held arranged substantially parallel to the longitudinal axis.

13. A box according to claim 1, wherein a width and a height of said second inner end surface of the casing are substantially equal to integer multiples of a width and a height of a bottom surface of the first cell, respectively, and said interval between the first inner end surface and the second inner end surface of the casing is substantially equal to an integer multiple of a length of the second cell.

14. A box according to claim 1, wherein at least a part of said perimetrical surface of said holder slidably contacts at least a part of said inner perimetrical surface of the casing.

15. A box according to claim 1, wherein said inner perimetrical surface of the casing defining a space between said second end surface of the holder and said second inner end surface of the casing has a stopper to prevent said holder from moving over said stopper.

16. A box according to claim 1, wherein a part of an inner surface defining said through hole of said holder slidably contacts a side surface of said second cell.

17. A box according to claim 1, wherein a part of said casing constitutes a lid portion for exchanging a cell, said lid portion being capable of opening and closing.

18. A box according to claim 1, wherein a part including said second inner end surface of said casing constitutes a lid portion for exchanging a cell, said lid portion being capable of opening and closing.

19. A box according to claim 1, wherein a top surface and a bottom surface of said second cell are smaller than a top surface and a bottom surface of said first cell.

20. A box according to claim 1, wherein the first cell is lithium cell pack, and the second cell is a dry cell.

21. A box according to claim 1, wherein said cavity is capable of receiving at least two second cells which are serially arranged, and said box further comprises energizing means capable of biasing said holder in a direction parallel to the longitudinal axis so that said holder holds a contact portion between said at least two second cells.

22. An optical apparatus having an electrically driven equipment and a cell box according to claim 1, said electrically driven equipment receiving electric power from said cell box.

23. An apparatus according to claim 22 wherein said optical apparatus is an image stabilized optical apparatus comprising:

a casing, an objective system and an eyepiece system which are mounted on the casing, a gimbal which is attached to the casing through two axes of rotation, said axes intersecting at right angle with each other, so that said gimbal is capable of oscillating in both directions of tilting and panning, an erect prism which is located between the objective system and the eyepiece system and attached to the gimbal, a motor which is attached to the gimbal, an inertial rotor which is mounted on a rotating shaft of the motor, and said cell box which supplies electric power to said motor.

24. An apparatus according to claim 22 wherein the casing of the cell box is integrally formed with the casing of the optical apparatus.

* * * * *

UNITED STATES PATENT AND TRADEMARK OFFICE
CERTIFICATE OF CORRECTION

PATENT NO. : 5,612,147
DATED : March 18, 1997
INVENTOR(S) : Nagata

It is certified that error appears in the above-indentified patent and that said Letters Patent is hereby corrected as shown below:

```
Column 13, Line 7, after "inner" delete --,--;

Line 49, change "9" to --1--.
```

Signed and Sealed this

Twenty-fourth Day of June, 1997

Attest:

BRUCE LEHMAN

*Attesting Officer*  *Commissioner of Patents and Trademarks*